United States Patent [19]

Staroselsky et al.

[11] Patent Number: 4,494,006
[45] Date of Patent: Jan. 15, 1985

[54] METHOD AND APPARATUS FOR CONTROLLING A MULTICOMPRESSOR STATION

[75] Inventors: Naum Staroselsky; Saul Mirsky, both of Des Moines, Iowa

[73] Assignee: Compressor Controls Corporation, Des Moines, Iowa

[21] Appl. No.: 418,224

[22] Filed: Sep. 15, 1982

[51] Int. Cl.³ ............................ F02C 6/10; F04B 41/06
[52] U.S. Cl. ............................................. 290/4; 417/5
[58] Field of Search ........................................ 417/2–5; 290/4, 40 R

[56] References Cited

U.S. PATENT DOCUMENTS

| | | | |
|---|---|---|---|
| 2,312,728 | 3/1943 | O'Hagan et al. | 417/3 |
| 3,223,040 | 12/1965 | Dinkelkamp | 417/3 |
| 3,648,479 | 3/1972 | Richardson | 417/3 |
| 4,225,289 | 9/1980 | Burkett | 417/3 |
| 4,248,054 | 2/1981 | Watson et al. | 417/3 |
| 4,330,237 | 5/1982 | Battah | 417/2 |

Primary Examiner—Stanley J. Witkowski
Assistant Examiner—Shelley Wade
Attorney, Agent, or Firm—Henderson & Sturm

[57] ABSTRACT

A method of control and control apparatus for load sharing between multiple compressors working in parallel and/or in series which enables all of the load-sharing compressors to carry their optimum share of the load. This load-sharing scheme follows the safest load-sharing formula and also provides for substantial energy savings. It automatically divides the load whenever a strong decoupling between process control and compressors after the compressors' operating points cross their Surge Control lines.

9 Claims, 2 Drawing Figures

METHOD AND APPARATUS FOR CONTROLLING A MULTICOMPRESSOR STATION

BACKGROUND OF THE INVENTION

The present invention relates generally to a method and apparatus for compressors, and more particularly to a method and apparatus for controlling compressors in parallel or in series which enables all of the load-sharing compressors to carry their optimum share of the load.

Conventional control systems of compressor station consisting of centrifugal and/or axial compressors do not cope with two major problems:

Those associated with load sharing of multiple compressors working in parallel and/or in series and those associated with controller loop interaction especially between process control loops and antisurge protective loops.

Conventional load-sharing techniques for multiple compressors allow one compressor to operate closer to its surge limit than other compressors. For instance for parallel operations, one compressor may even be overloaded to the risk of tripping off and shutting down, while another compressor is less loaded on the verge of going into surge. This creates not only the dangers of surge-and overload-created compressor damage, but also of wasted energy through recycling or blowing off flow and the possibility of process interruption.

Since conventional load-sharing control strategies are unable to load compressors properly, compressors frequently wrestle loads back and forth between them. This load oscillation degrades system performance and efficiency, and it may lead to damage or process shutdown.

The normal function of a station process control is to maintain its controlled variable equal to some set point. For instance, it may be required to maintain the discharge pressure or flow of the station. When called upon to protect one of the compressors from surge, an antisurge controller will have, as its function, to reduce the compressors' pressure differential and to increase flow at the same time. Operating independently and at cross purposes, then, conventional process controllers and antisurge controllers may create oscillations of pressure and flow that degrade process control and reduce antisurge protection.

To prevent such oscillations, conventional process and antisurge controllers are made to react slowly. This results in degraded process control, reduced antisurge protection and surge damage because of the slow control response and because of interaction between the two controllers. It may also shorten compressor life due to surges resulting from less than optimum control. Conventional controllers cannot achieve fast control and stability at the same time. They, therefore, are detuned to provide sluggish, but stable, control.

The control of multicompressors may be significantly improved by using a cascade control including a process control loop, load-sharing control loops and antisurge protective loops. The load-sharing loops enable all of the load-sharing compressors to carry their optimum share of total flow (for parallel operations) or total pressure differential (for series operation), providing for equidistant operation from surge control lines. In addition, each load-sharing loop provides for effective decoupling between process control loop and control member of compressor while the compressors' operating point crosses the surge control line.

SUMMARY OF THE INVENTION

A purpose of the present invention is to enable all of the load-sharing multiple compressors to carry their optimum share of total flow or total pressure differential (equidistant from a preselected surge control line) without risking surge in any of the compressors. Some of the advantages of this invention are the expansion of the safe operating zone of the compressor station without re-circulation or blow-off, and the increase of safety of operation of compressors and the process using the compressed gas.

According to this invention, each compressor of a multicompressor station is operated by two interconnected control loops. The first of them is the antisurge control loop preventing from crossing the pre-established safe operating surge control line and computing a criterion representing the distance between compressors' operating point and said surge control line. This control loop operates the antisurge recycle or blow-off valve. The secondary loop is the load-sharing control loop which is a secondary loop in an automatic cascade system including also a primary master station controller.

The load-sharing control loop changes the control compressor performance, i.e. the criterion representing the distance between compressors' operating point and surge control line, which is computed by antisurge control loop. The set point for the load-sharing control loop is developed by the station master controller.

An object of this invention is decoupling between the process control and compressor by using the cascade system including a primary process control loop and a secondary load control loop. This secondary loop controls the criterion representing the relative distance between operating point of compressor and its surge control line. This criterion can be increased only by the limited value which is not enough to drive a compressor to surge.

Another object of this invention is optimization of load-sharing between multiple compressors by controlling the criterion representing the relative distance between operating point of compressor and its surge control line on the equal level for all load-sharing compressors in operation.

Still another object of the invention is to provide for control apparatus of a type described above, which is characterized by its simplicity, great transient and steady state precision and high reliability.

Other objects, advantages, and novel features of the present invention will become apparent from the following detailed description of the invention when considered in conjunction with the accompanying drawings.

BRIEF DESCRIPTIONS OF THE DRAWINGS

FIG. 1 is a schematic diagram of a control system for a multiple compressor station constructed in accordance with the present invention; and FIG. 2 shows a compressor map of a typical single one of the compressors of FIG. 1 with plotted lines representing operating conditions.

DESCRIPTION OF THE PREFERRED EMBODIMENT

Figure 1:
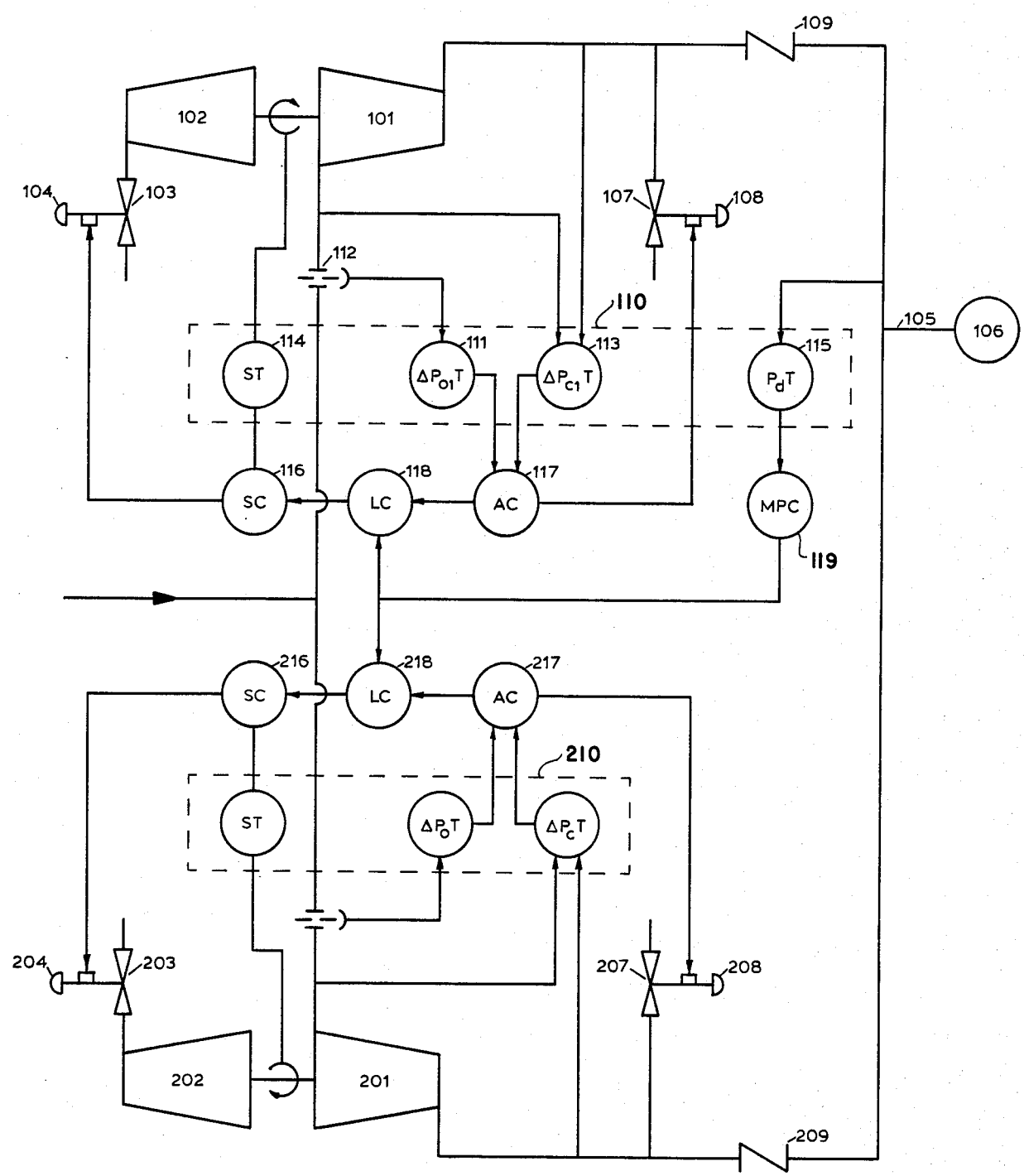

Referring now to the drawings, FIG. 1 shows a compressor station with a control system including a load control loop constructed in accordance with the present invention. This installation includes dynamic compressors 101 and 201 working in parallel for compressing a gas. Turbine drives 102 and 202 are provided for driving compressors 101 and 201 respectively. Steam distributing means 103 and 203 having actuators 104 and 204 are also connected to compressors 101 and 201 respectively. A pipeline 105 connects the compressors 101 and 205 with a user 106 of compressed gas.

Each compressor 101 and 201 is supplied by a relief means 107 or 207 with actuators 108 or 208 respectively. Each compressor 101 and 201 also has a check valve 109 or 209 associated therewith and being located downstream from the respective relief means 107 and 207 respectively and upstream from the common pipeline 105.

The control system of FIG. 1 multiple compressor station consists of nine control modules. The first such control module is a module 110 including four transmitters: a pressure differential transmitter 111, measuring a pressure differential across the out orifice 112; a pressure differential transmitter 113, measuring the pressure differential across compressor 101; a speed transmitter 114 and a station pressure transmitter 115.

The second control module 210 includes three transmitters: a pressure differential transmitter 211, measuring the pressure differential across the outlet orifice 212; a pressure differential transmitter 213 across compressor 201 and a speed transmitter 214.

A third and a fourth modules are speed governor 116 and 216 controlling the speed of turbines 102 and 202 respectively. A fifth and a sixth control modules are the antisurge modules controlling 117 and 217 operating the relief valves 107 and 207 respectively.

The equation of the surge control line of each controller 117 and 217 is, for instance:

$$K_i P_{ci} + b_i = P_{oi} \quad (1)$$

where:
$P_{ci}$ is the pressure differential across compressor;
$P_{oi}$ is the pressure differential across the inlet orifice.
$K_i$ is the slope of surge control line;
$b_i$ is the distance between surge control and surge limit line;
i is the identification index of the compressor.

If some other equations of surge control line are used, depending on selected compressor map, their general equation of the surge control line may be presented as:

$$K f(Z) Y + b = X \quad (2)$$

where:
Y and X are chosen compressor map coordinates;
$K \times f(Z)$ is the variable slope of surge control line;
Z is a control variable influencing the slope of surge limit, such as molecular weight, position of guide vanes, etc.

On the known Compressor map, the distance between the compressors operating point and selected Surge Control Line may be measured using Criterion "S" as follows:

$$S = \frac{kf(Z)Y + b}{X} \quad (3)$$

S varies from values close to zero to 1. The value of 1 is reached while the compressors' operating point meets the Surge Control Line. The antisurge controllers 117 and 217 compute criterion "S" for compressors 101 and 201 respectively.

A seventh and an eighth control module comprise the load controllers 118 and 218. These controllers control the criterion "S" for compressors 101 and 201 respectively. Computed by each controller 117 or 217, the Criterion "S" is normalized according to the following equation:

$$S_{ni} = B_{1i}(S_i - 1) + B_{2i} \quad (4)$$

where:
$S_{ni}$ is normalized value of criterion "S";
$B_{1i}$ and $B_{2i}$ are constant coefficients.

This normalization is provided to transform the criterion $S_i$ with the minimum value variation from 0.1, for instance, to 0.8 to the $S_{ui}$ value with the range from zero to 1.

In addition, if $B_2 = 1$, then the process variable of load Controller 118 or 218 $S_{ni}$ reaches its highest value 1, while the Criterion "Si" also reaches the value 1, which means that the compressors' operating point meets its Surge Control Line.

Figure 2:
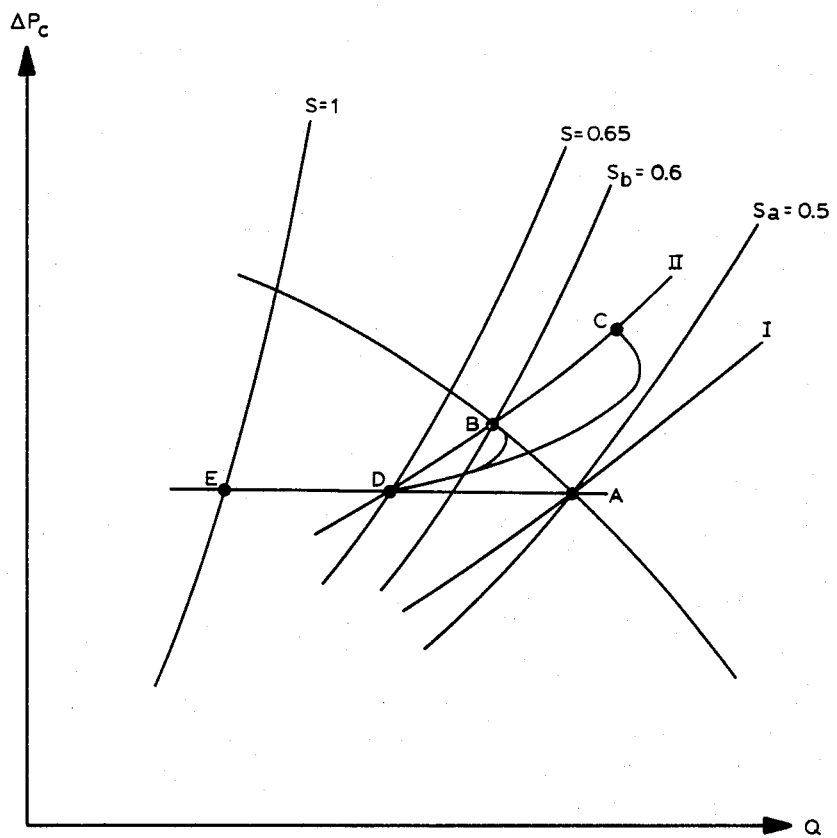

In order to prevent the pressure increase up to the level C, the "S" Criterion goes through the first order lag filter located in the Controller 118. This prevents interaction between loops controlling "S" Criterion of load controllers 118 and 218 and discharge pressure through pressure controller 119. The transient process which starts at the point A has the transient path ABCD without the above identified first order lag filter and it has the transient path ABD with the first order lag filter disposed within load controllers 118 and 218 and in both cases ends while the compressors' operating point reaches the location D on the Compressor Map. (See FIG. 2.) Further increase of the process resistance finally moves the compressors' operating point to the location where it meets with the surge control line antisurge Controller 117.

If a normalization coefficient $B_2$ is equal to 1, then the above identified point D corresponds to the maximum output of the master controller 119. If, however, $B_2$ is slightly less than 1 (e.g. if $B_2 = 0.98$.), then the Master Pressure Controller 119 still has room to drive the operating point toward surge, crossing the surge control line of the controller 117. After such crossing, the antisurge controller 117 starts to open the relief valve 107 until criteria S is now restored to the value 1, corresponding to the point D on the Compressor Map. The main advantage of the above scheme is the decoupling provided by load controller 118 preventing the master pressure controller 119 from driving compressor 101 toward surge after the compressor crosses its surge control line.

If both compressors 101 and 201 are in operation, then the master pressure controller 119 changes the set points for the two load controllers 118 and 218, controlling normalized criterion $S_n$. The same settings of coefficients $B_{21}$ for both compressors will cause then the simultaneous reaching of the surge control lines. This is also true for compressors operating in series or a combination of machines operated in parallel and in series.

The above identified scheme is very flexible and can be used for different size compressors.

Obviously many modifications and variations of the present invention are possible in light of the above teachings. It is therefore to be understood that, within the scope of the appended claims, the invention may be practiced otherwise than as specifically described.

We claim:

1. A method of controlling a compressor station receiving gas from an upstream process, compressing the gas and delivering it to a process downstream thereof, said compressor station having a station control means to adjust the station performance to the demand of a process located upstream or downstream, said compressor station including also a plurality of dynamic compressors driven by a plurality of respective prime movers, each of said dynamic compressors having a variable performance, a main control means associated with each of said compressors for changing its performance and a surge control means associated with each respective compressor for maintaining said respective compressor along a surge control line having a predetermined equation and located a predetermined distance from the respective surge limit of each respective compressor; said method comprising:

transforming said predetermined equation of each respective surge control line into a variable criterion representing a relative distance between each respective compressor's operating point and its surge control line, said variable criterion reaching a predetermined value when said relative distance reaches zero value;

simultaneously changing the set points for all of said respective criterions representing the relative distance between each respective compressor's operating point and its surge control line by changing an output of said station control means to control the performance of said compressor station; and keeping said set points equal and maintaining said criterion substantially equal at substantially all times for each of said respective compressors.

2. The method of claim 1 further comprising limiting said respective set points and providing for a decoupling between each respective compressor and said station control means to avoid a dangerous approaching of said respective surge limit line after the compressor's operating point crosses its surge control line and reaches some predetermined deviation from said control line.

3. The method of claim 1 wherein said equation is $kf(Z)Y + b = X$, where $Kf(Z)$ is the variable slope of the surge control line and b is the bias representing the respective distance between the surge control line and the surge limit line, said criterion equaling $$\frac{Kf(Z)Y + b}{X}$$

where X, Y and Z are the compressor variables representing the respective compressor performance and are used to build the respective compressor maps.

4. The method of claim 3 wherein X is a parameter related to flow through each respective compressor, Y is a parameter related to the pressure differential across each respective compressor, and Z is a parameter related to the speed of rotation of each respective compressor.

5. The method of claim 3 wherein X is a parameter related to flow through each respective compressor, Y is a parameter related to the pressure differential across each respective compressor, and Z represents the position of guide vanes of each respective compressor.

6. The method of claim 3 wherein X is a parameter related to flow through each respective compressor, Y is a parameter related to the pressure differential across each respective compressor, and Z represents a parameter related to the inlet density of the fluid entering each respective compressor.

7. Apparatus for controlling a compressor station receiving a gas from upstream of a process, compressing the gas and delivering it to the process downstream thereof, said compressor station including a plurality of respective prime movers, each of said dynamic compressors having a variable performance defined by three variable parameters, a main control means associated with each of said compressors for changing the performance of each respective compressor, a surge control means associated with each respective compressor for maintaining each respective compressor along a predetermined surge control line and located a predetermined distance from the respective surge limit of each respective compressor; the improvement comprising:

means for maintaining one of the gas parameters constant for each respective compressor;

means for computing a criterion respresenting a relative distance between each respective compressor's operating point from the respective surge control line;

set point control means for controlling one of said gas parameters by simultaneously changing the set points of each respective compressor for said criterion, representing the relative distance between each respective compressor's operating point and its surge control line; and means for maintaining said criterion substantially equal at substantially all times for each of said compressors.

8. The apparatus of claim 7 wherein said means for maintaining one of the gas parameters constant includes a primary closed loop controller having an output.

9. The apparatus of claim 8 wherein said set point control means comprises a secondary closed loop controller means for each of said compressors for receiving the output of said primary controller as its set point and changing the performance of each respective compressor by opening its main control means, each of said secondary closed loop controller means further maintaining said criterion representing the relative distance between each compressor's operating point and each respective surge control line at the required level corresponding to the set point developed by said primary controller means.

* * * * *